C. S. HASTINGS.
LENS SYSTEM FOR TERRESTRIAL TELESCOPES.
APPLICATION FILED JULY 10, 1920.
1,395,822.   Patented Nov. 1, 1921.
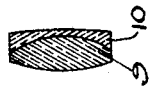
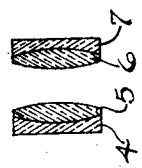
Inventor.
Charles S. Hastings
by Seymour & Earle
Atty

UNITED STATES PATENT OFFICE.

CHARLES S. HASTINGS, OF NEW HAVEN, CONNECTICUT.

LENS SYSTEM FOR TERRESTRIAL TELESCOPES.

1,395,822.   Specification of Letters Patent.   Patented Nov. 1, 1921.

Application filed July 10, 1920. Serial No. 395,287.

*To all whom it may concern:*

Be it known that I, CHARLES S. HASTINGS, a citizen of the United States, residing at New Haven, in the county of New Haven and State of Connecticut, have invented a new and useful Improvement in Lens Systems for Terrestrial Telescopes; and I do hereby declare the following, when taken in connection with the accompanying drawings and the characters of reference marked thereon, to be a full, clear, and exact description of the same, and which said drawings constitute part of this application, and represents a diagrammatic view of a terrestrial telescope lens computed in accordance with my invention.

My invention relates to an improvement in optical lens systems for telescopes. The object of my invention is to produce a telescope of the terrestrial type with especial reference to the use of the said telescope as a sight for rifles.

A telescope for such purposes must deviate in certain important respects from the ordinary terrestrial telescope. It must be short, light in weight and small in diameter, since it is to be mounted upon a rifle; it must have a long eye distance, so that the recoil of the arm may not bring the eye piece in contact with the eye; it must have a large field of great brilliancy and wide angle; and it must be initially adaptable to a considerable range of magnification.

With these ends in view, my invention consists in a telescope of the type described, characterized by having a complex objective of short negative focal length and an ocular of positive focal length. My invention further consists in a telescope of the character described having certain details of design and construction as will be hereinafter described and pointed out in the claims.

In carrying out my invention, as herein shown, I employ a sequence of nine lenses, grouped for purposes of computation in two groups, the first consisting of three cemented doublets which, as a system, compose my complex objective of short negative focal length; the second group consisting of a single lens followed by a cemented doublet; these composing my ocular system of positive focal length.

In the prior art it has been customary to compute terrestrial telescopes of this type in either of two ways, both differing from my improved construction. Such telescopes have been considered from one point of view as consisting of an objective system, an inverting system and an ocular system and in the computation of the lenses for such a telescope, each of these systems has been computed so as to be as nearly optically correct and free from aberrations and other optical errors as possible. From another point of view such telescopes have been considered as consisting of a simple objective of positive focal length followed by an ocular which is in effect a compound microscope; each of these two co-acting systems being computed so as to be optically correct in itself.

I have discovered that by putting together into a single system for purposes of computation the two systems customarily known as the objective and inverter systems I am enabled to so proportion the lenses of my system that my six-lens objective system having a short negative focal length, although composed of subordinate systems which are themselves optically faulty, is itself free from optical errors and when combined with my improved ocular system, which has a positive focal length, will produce a telescopic system having all of the advantages desirable for the purposes set forth and especially characterized by the fact that I am enabled to employ satisfactorily, rays of light deviating four times as far from the optical axis as was the case in any previous system having as small a number of lenses as I am enabled to employ.

In practising my invention, as shown in the accompanying drawing, the lenses 2, 3, 4, 5, 6 and 7 are the components of my compound objective of negative focal length and the lenses 8, 9 and 10 compose my ocular system of positive focal length. The lenses numbered 2, 4, 7 and 10 are formed from a glass known as dense optical flint having an index of refraction $N_D = 1.61655$ and the lenses numbered 3, 5, 6, 8 and 9 are formed of a glass known as heavy crown, having an index of refraction $N_D = 1.52472$. The light incident upon the system is supposed to fall upon the outer surface of the lens 2 and to emerge from the system at the outer surface of the lens 10. Thus the direction of the light propagated through the system is from left to right and for purposes of computation, as is customary, this direction is assumed to be positive; the contrary direction thus becoming negative.

The radii of curvature of the successive surfaces beginning with the left hand, or outer surface, of the lens 2 are, as follows, the dimensions being given in inches, and each radius being measured *from* the surface *toward* the center: $r_1=2.170$, $r_2=0.686$, $r_3=-2.535$, $r_4=\infty$, $r_5=0.945$, $r_6=-1.115$, $r_7=1.115$, $r_8=-0.945$, $r_9=\infty$, $r_{10}=6.000$, $r_{11}=-1.000$, $r_{12}=1.081$, $r_{13}=-0.625$, $r_{14}=-3.793$.

The thicknesses of the successive lenses in the same order are as follows:—$t_1=0.060$, $t_2=0.130$, $t_3=0.060$, $t_4=0.161$, $t_5=0.161$, $t_6=0.060$, $t_7=0.130$, $t_8=0.268$, $t_9=0.050$.

the separations are as follows:—$s_1=5.220$, $s_2=0.298$, $s_3=3.220$, $s_4=0.570$ With these constants the focal lengths of the successive units (2, 3), (4, 5), (6, 7), (8), (9, 10) are approximately $+2.83''$, $+2.64''$, $+2.64''$, $+1.64''$, $+2.01''$ respectively, the focal length of the complex six-lens objective is approximately $-2.86''$ and the focal length of the three-lens ocular is approximately $+1.08''$.

The objective, namely the system composed of the lenses 2, 3, 4, 5, 6, and 7 is computed as a unit to eliminate as far as possible the optical errors; particularly distortion of the field, curvature of the field, astigmatism in the field, spherical aberration, chromatic aberration and chromatic difference of magnification.

In the same way the ocular system, composed of the lenses 8, 9 and 10, is computed as a unitary system. By this method of treatment, I produce a telescope system composed of a six-lens objective of negative focal length which as a unit is optically correct, but in which the anterior doublet 2—3 or the posterior pair of doublets 4—5 and 6—7 are not optically correct but compensate each other's errors and could not be replaced by optically correct lenses of equal focal length.

An added advantage due to this mode of grouping of the lenses is that I am enabled to vary the distance from the lens 3 to the lens 4 to a considerable extent, thus initially changing the magnification of the telescope through a comparatively large range without harming the character of the image produced by the complex objective.

Moreover, I am enabled by this manner of grouping the lenses to utilize an ocular consisting of only three lenses, namely, a single field lens and a doublet eye lens in place of the customary 4 or 5 lens combination which has hitherto been found necessary in telescopes computed by the older methods.

Thus my telescope is characterized by having a complex objective system of short, negative, focal length which cannot be separated into individually optically correct objective and inverter systems, but in which on the other hand, the component lenses and combinations of lenses are in themselves optically faulty, forming compensating effects.

My telescope is further characterized by having an ocular system of positive focal length and composed of only three lenses.

The final adjustment of the spherical aberration of the system is made by varying the ratio of the radii of curvature of the surfaces of the ocular field-lens and I have discovered that the use of different varieties of glass will also compel a change in this ratio. I find that my telescope system is characterized by the fact that this ratio will have values ranging from $\frac{1}{4}$ to $\frac{1}{3}$ inclusive.

The dimensions given herein may be varied as required by the optical qualities of the glass available at any given time for use and also by the precise values of the power, angular field, etc., desired.

In the foregoing treatment and in the appended claims, where I have stated that the focal length is positive or negative, I intend the words "focal length" to mean the distance from the second principal point to the second principal focus of the system under discussion in the appended claims, I intend the word "unit" to represent either a cemented doublet such as 2 and 3 or the independent single lens 8.

I claim:

1. An optical system for telescopes consisting solely of a complex objective of negative focal length and a complex ocular of positive focal length, the said objective and the said ocular being composed of units of positive focal length only.

2. An optical system for telescopes consisting solely of a complex objective of negative focal length and a complex ocular of positive focal length, the said objective and the said ocular being composed of units of positive focal length only, the said units of the said objective system being collectively adjusted to minimize spherical and chromatic aberrations.

3. A telescope having a complex objective system of negative focal length, consisting of three cemented doublets, and a complex ocular system of positive focal length, consisting of a field lens and cemented doublet eye-lens, the said doublets of both the said systems and the said field lens of the said ocular system being each of positive focal length.

4. A telescope having a complex objective system of negative focal length, consisting of three cemented doublets, and a complex ocular system of positive focal length, consisting of a field lens and cemented doublet eye-lens, the said doublets of both the said systems and the said field lens of the said ocular system being each of positive focal length, the said objective system being collectively adjusted to correct distortion in the field, curvature of the field, astigmatism of the field and chromatic and spherical aberrations.

5. A telescope objective of short negative focal length, consisting of three cemented doublets each of positive focal length, yielding two interior real images each of these images being separately corrected for chromatic and for spherical aberrations at the axis.

6. An objective of negative focal length of approximately $-2.86$ in. composed of three cemented achromatic doublets, each comprising a lens of flint glass, $N_D = 1.616$, and a lens of crown glass, $N_D = 1.525$, the successive surfaces of the system having the following radii of curvature:—$r_1 = 2.17$ in., $r_2 = 0.69$ in., $r_3 = -2.54$ in., $r_4 = \infty$, $r_5 = 0.95$ in., $r_6 = -1.12$ in., $r_7 = 1.12$ in., $r_8 = -0.95$ in., $r_9 = \infty$.

7. An ocular of positive focal length of approximately 1.08 in., composed of a simple crown glass ($N_D = 1.525$) lens and a cemented doublet of crown glass ($N_D = 1.525$) and flint glass ($N_D = 1.616$), the successive surfaces of the system having the following radii of curvature:—$r_1 = 6.00$ in., $r_2 = -1.00$ in., $r_3 = 1.08$ in., $r_4 = -0.63$ in., $r_5 = -3.79$ in.

8. A system comprising the system of claims 6 and 7.

9. A telescope ocular of positive focal length consisting of a cemented doublet eye-lens and a biconvex field-lens, characterized by the fact that the radius of curvature of one of the surfaces of the said field-lens is from four to eight times as great as the radius of curvature of the other surface thereof.

In testimony whereof, I have signed this specification in the presence of two subscribing witnesses.

CHARLES S. HASTINGS.

Witnesses:
 DANIEL H. VEADER,
 ERIK S. PALMER.